US010292045B2

(12) United States Patent
Liang

(10) Patent No.: US 10,292,045 B2
(45) Date of Patent: May 14, 2019

(54) INFORMATION OBTAINING METHOD AND INFORMATION OBTAINING DEVICE

(71) Applicant: NANNING FUGUI PRECISION INDUSTRIAL CO., LTD., Nanning (CN)

(72) Inventor: Yuan-Tao Liang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 72 days.

(21) Appl. No.: 15/684,971

(22) Filed: Aug. 24, 2017

(65) Prior Publication Data
US 2019/0069165 A1 Feb. 28, 2019

(51) Int. Cl.
H04W 8/22 (2009.01)
H04W 72/02 (2009.01)
H04W 72/04 (2009.01)
H04B 17/309 (2015.01)
H04W 88/02 (2009.01)

(52) U.S. Cl.
CPC ............ *H04W 8/22* (2013.01); *H04B 17/309* (2015.01); *H04W 72/0473* (2013.01); *H04W 72/02* (2013.01); *H04W 88/02* (2013.01)

(58) Field of Classification Search
CPC ............ H04W 72/02; H04W 72/0473; H04W 72/048; H04W 72/0493; H04W 88/02; H04W 8/02; H04B 17/309; H04B 17/318; H04B 17/382
See application file for complete search history.

(56) References Cited

U.S. PATENT DOCUMENTS

| 9,258,597 | B1* | 2/2016 | Clayton | H04N 21/4882 |
| 9,461,953 | B2* | 10/2016 | Hideishi | H04L 51/24 |
| 9,584,873 | B2* | 2/2017 | Chen | H04N 21/6547 |
| 2013/0218553 | A1* | 8/2013 | Fujii | G10L 15/26 704/9 |
| 2013/0325958 | A1* | 12/2013 | Mizuki | H04L 51/32 709/204 |
| 2015/0058406 | A1* | 2/2015 | Rezvani | G06F 21/31 709/203 |
| 2016/0132840 | A1* | 5/2016 | Bowles | G06Q 30/0278 705/306 |
| 2016/0182971 | A1* | 6/2016 | Ortiz | H04N 21/8133 725/34 |
| 2016/0330500 | A1* | 11/2016 | Houdaille | H04L 65/4084 |

FOREIGN PATENT DOCUMENTS

| CN | 103731264 A | | 4/2014 |
| CN | 104683864 | * | 6/2015 |
| CN | 104683864 A | | 6/2015 |

* cited by examiner

Primary Examiner — Afsar M Qureshi
(74) Attorney, Agent, or Firm — ScienBiziP, P.C.

(57) ABSTRACT

An information obtaining method, executable by a processor of an over the top (OTT) for interacting with a mobile terminal and displaying notification information on a display interface. The method includes: receiving a first ID recognizing frequency from mobile terminal, sending first confirming information to the mobile terminal according to the first ID recognizing frequency, receiving an information category frequency sent by the mobile terminal according to the first ID recognizing frequency, and displaying the notification information corresponding to the information category frequency on the display interface.

17 Claims, 7 Drawing Sheets

INFORMATION OBTAINING METHOD AND INFORMATION OBTAINING DEVICE

FIELD

The subject matter herein generally relates to information obtaining technology fields, especially relates to information obtaining method and information obtaining device.

BACKGROUND

Users often install Apps in on-the-top Boxes (OTT) and Set-top-Boxes(STB) to obtain information messages. OTT and STB usually set in living room with display screen like television and shared for all the families. However, users login the apps in the OTT and STB by account numbers, and the system can only let one user login, and the limitation results in that the display screen can only show messages for one user.

BRIEF DESCRIPTION OF THE DRAWINGS

Embodiments of the present technology will now be described, by way of example only, with reference to the attached figures, wherein.

DETAILED DESCRIPTION

Figure 1:
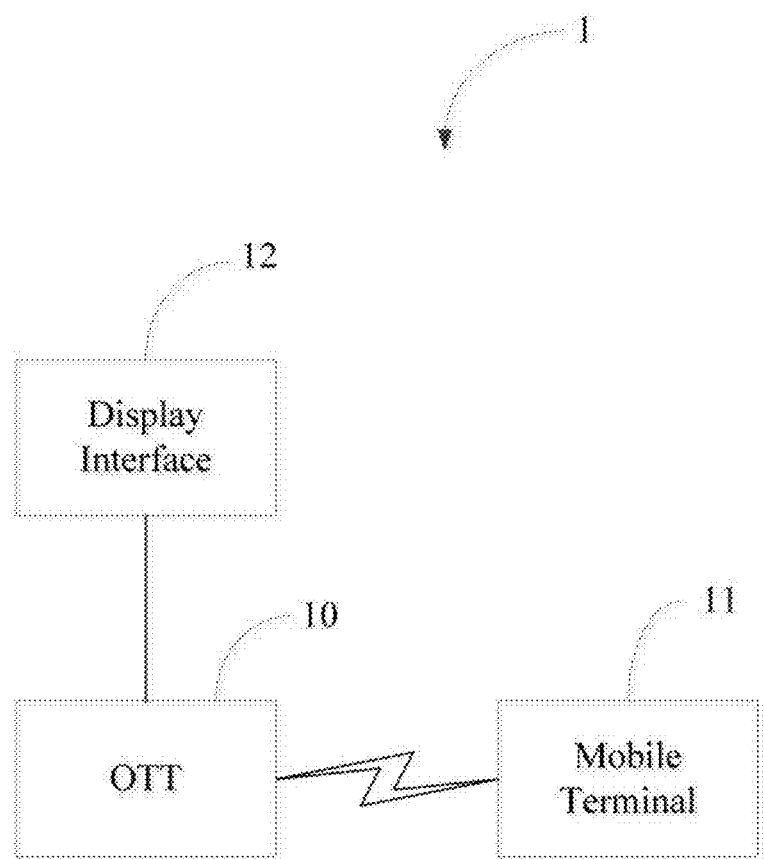
FIG. 1 illustrates a framework diagram of an embodiment of an information interaction device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one."

In general, the word "module" and "unit" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 shows a framework diagram of an embodiment of an information interaction device.

In one embodiment, the information interacting device 1 comprises an over-the-top (OTT) 10 or set top box (not shown), a mobile terminal 11 and a display interface 12. The OTT 10 is electrically connected to the mobile terminal 11 and the display interface 12.

In one embodiment, the mobile terminal 11 sends information to the OTT 10 when the mobile terminal 11 receives short message, email, phone call or an system event has occurred (such as out of power). The OTT 10 is configured to obtain the information from the mobile terminal 11 and to drive the display interface 12 displays the information.

In one embodiment, the mobile terminal 11 can be cell phone, pad, notebook and other mobile devices, the display interface 12 can be LED, LCD, projection screen and other display devices.

In one embodiment, the OTT 10, mobile terminal 11 and display interface 12 can be electrically connected by cable. In other embodiments, the mobile terminal 11 can communicate with the display interface 12 wirelessly by Wifi, Bluetooth and other wireless connection types.

Figure 2:
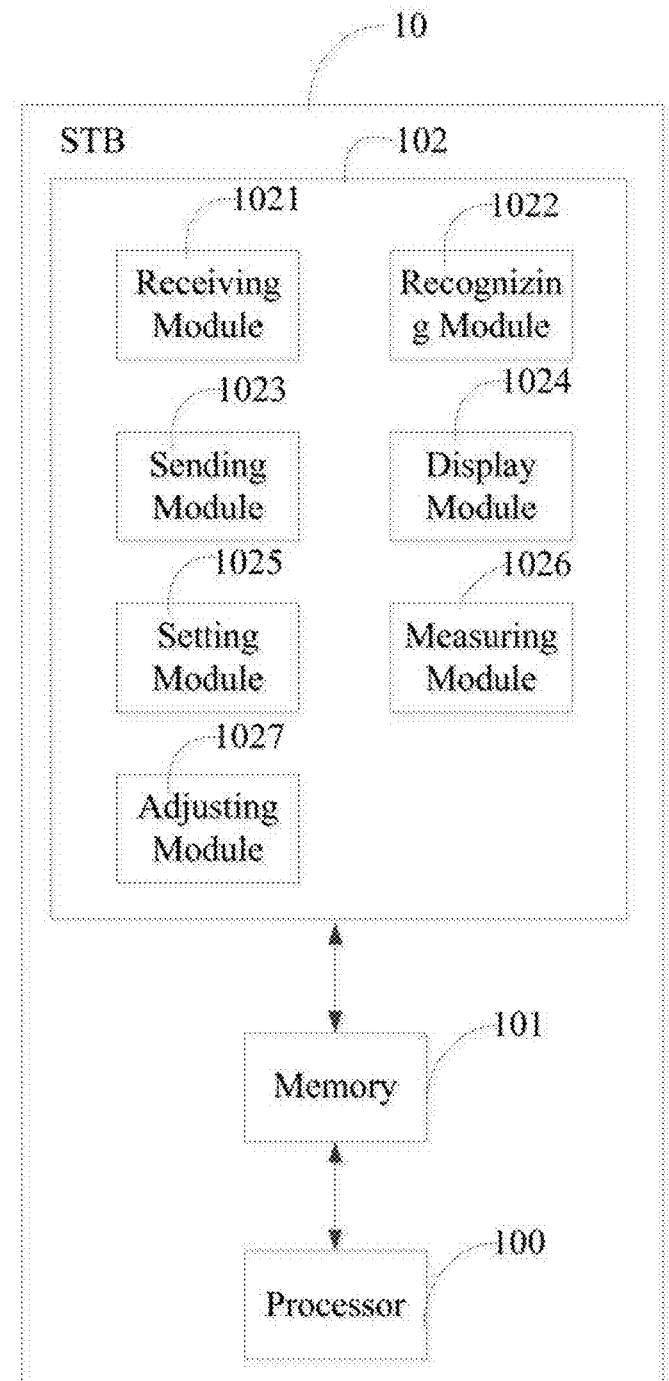
FIG. 2 illustrates a framework diagram of OTT in the information interaction device of FIG. 1.

FIG. 2 illustrates a framework diagram of OTT in the information interaction device of FIG. 1.

In one embodiment, the OTT 10 has installed an information interacting system 102, and the OTT 10 comprises a processor 100 and a memory 101.

In one embodiment, the information interacting system 102 comprises one or more function modules. The one or more function modules can include computerized code in the form of one or more programs that are stored in the memory 101, and executed by the processor 100 to implement functions of the information interacting system 102. The memory 101 can be a dedicated memory, such as an EEPROM or a flash memory.

In one embodiment, the processor 100 can be central processing unit (CPU), controller, micro controller or other processing chips.

In one embodiment, the information interacting system 102 comprises a receiving module 1021, a recognizing module 1022, a sending module 1023, a display module 1024, a setting module 1025, a measuring module 1026 and an adjusting module 1027.

In one embodiment, the receiving module 1021 is configured to receive a request information from the mobile terminal 11 for joining the information interacting system 102. The mobile terminal 11 sends the request information to join the information interacting system 102 when the mobile terminal 11 monitored there is no other mobile terminal communicating with the information interacting system 102.

In one embodiment, the display module 1024 is configured to drive the display interface 12 displaying contents. The display module 1024 drives the display interface 12 displaying an ID input interface. User sets ID information through the ID input interface, and the ID information comprises user's name, or name of the mobile terminal.

In one embodiment, the setting module 1025 is configured to set the ID information of the mobile terminal 11. The setting module 1025 sets the ID information of the mobile terminal 11 when the receiving module 1021 received the ID information. For example, when the receiving module 1021 received "jack", the setting module 1025 adds a new user "jack".

In one embodiment, the sending module 1023 is further configured to send a channel occupying signal. The sending module 1023 sends the channel occupying signal after the ID information is set. The channel occupying signal can be a 100 Hz audio, when other mobile terminal monitored the channel occupying signal, the other mobile terminal queue up to join the information interacting system 102.

In one embodiment, the measuring module 1026 is configured to measure signal attenuation degree of signal from the mobile terminal 11. The measuring module 1026 measures power of full frequency signal received by the receiving module 1021, and compares the measured power with a sending power of the full frequency signal to calculate difference value, and determines the signal attenuation degree of the signal from the mobile terminal 11. The full frequency signal comprises 20-20000 Hz audio signal. In one embodiment, the sending module 1025 is configured to send a signal compensation value according to the signal attenuation degree to the mobile terminal 11.

In one embodiment, the adjusting module 1027 is configured to adjust the signal output power of the mobile terminal 11. The adjusting module 1027 obtains the signal compensation value according to the signal attenuation degree, and drives the sending module 1023 sending the signal compensation value to the mobile terminal 11. For example, the measuring module 1026 measures the signal attenuation degree of the mobile terminal 11 being 0.2 dB. The adjusting module 1027 obtains the signal compensation value according to the signal attenuation degree being 0.2 dB, and the adjusting module 1027 sends the signal compensation value 0.2 dB to the mobile terminal 11. The mobile terminal 11 increases the output power with 0.2 dB when the mobile terminal 11 received the signal compensation value 0.2 dB from the OTT 10.

In one embodiment, the setting module 1025 is further configured to set feature information of the mobile terminal 11. The feature information comprises login music, a first ID recognizing frequency and information category frequency. The first ID recognizing frequency is configured to the OTT 10 recognizes the mobile terminal 11, and the information category frequency corresponding to different information types. For example, the first ID recognizing frequency can be 30 Hz, 40 Hz, 50 Hz and so on. The setting module 1025 sets the information category frequency according to types of the information from the mobile terminals 11. The setting module 1025 can set information category frequency corresponding to message, MSN, phone call, low power being 110 Hz, 120 Hz, 130 Hz and 140 Hz.

In one embodiment, the sending module 1023 stops sending the channel occupying signal since the feature information has been set.

In one embodiment, the receiving module 1021 is further configured to receive the first ID recognizing frequency, and the recognizing module 1022 recognizes the ID of the mobile terminal 11 according to the first ID recognizing frequency. For example, the mobile terminal 11 sends an audio with the first ID recognizing frequency when it received message or phone call. The receiving module 1021 and the recognizing module 1022 receive and recognize the first ID recognizing frequency.

In one embodiment, the sending module 1023 is further configured to send first confirming information, and the first confirming information can be a respond for the mobile terminal 11. The first confirming information can be audio with specific frequency, for example, the frequency of the first confirming information can be 25 Hz, 35 Hz, 45 Hz and so on. The sending module 1023 is further configured to send the channel occupying signal after the sending module 1023 sends the first confirming information, and the channel occupying signal can be 100 Hz audio.

In one embodiment, the receiving module 1021 is further configured to receive the information category frequency, and the display module 1024 displays the information corresponding to the information category frequency on the display interface 12. The mobile terminal 11 sends the information category frequency when the mobile terminal 11 receives the first confirming information. For example, when the mobile terminal 11 receives a message, the mobile terminal 11 sends the information category frequency 110 Hz. When the receiving module 1021 and the recognizing module 1022 receives and recognizes the information category frequency, the display module 1024 drives the display interface 12 displays information like "Jack: you have got a message". In one embodiment, the OTT 10 and mobile terminal 11 can be connected by WiFi, Bluetooth, and the contents of the message can be sending to the OTT 10, then the user can check the contents through the display interface 12.

In one embodiment, the sending module 1023 is further configured to send second confirming information when the receiving module 1021 received the information category frequency, and the second confirming information can be a respond for the mobile terminal 11. The second confirming information can be specific frequency audio like 115 Hz, 125 Hz, and so on.

Figure 3:
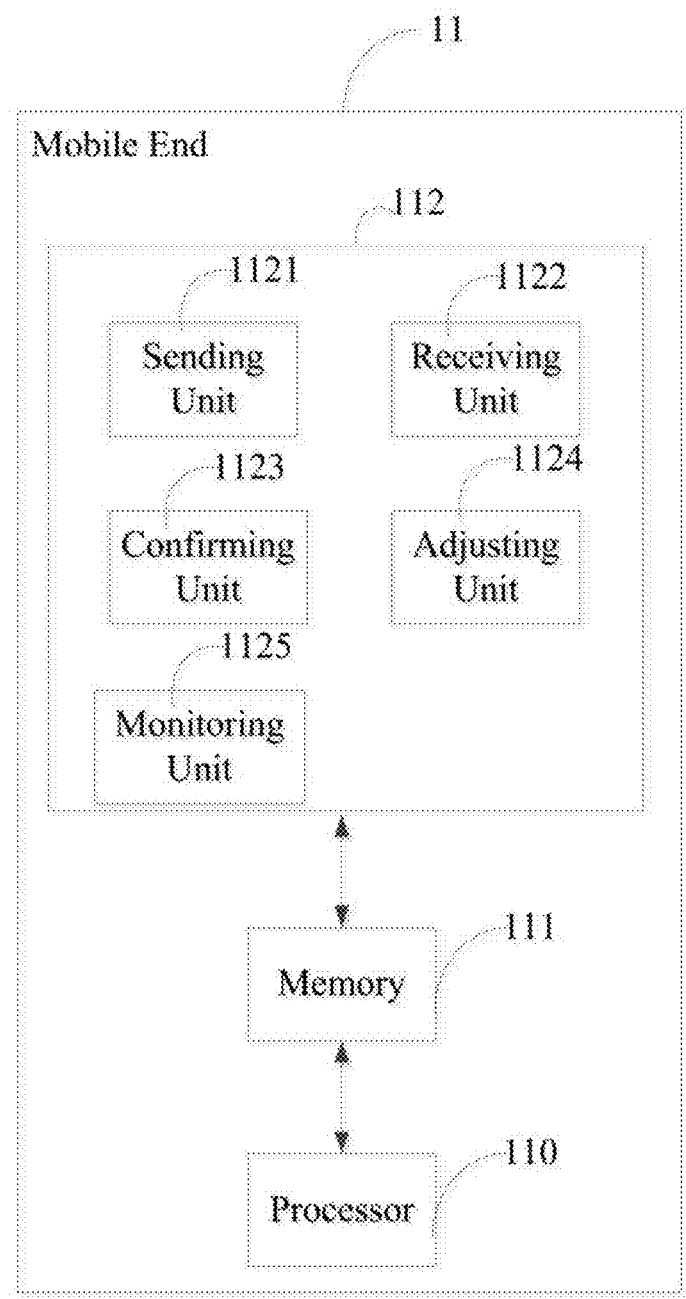
FIG. 3 illustrates a framework diagram of mobile terminal in the information interaction device of FIG. 1.

FIG. 3 illustrates a framework diagram of mobile terminal in the information interaction device of FIG. 1.

In one embodiment, the mobile terminal 11 has installed an information interacting system 102, and mobile terminal 11 comprises a processor 110 and a memory 111.

In one embodiment, the information interacting system 102 comprises one or more function modules. The one or more function modules can include computerized code in the form of one or more programs that are stored in the memory 111, and executed by the processor 110 to implement functions of the information interacting system 102. The memory 111 can be a dedicated memory, such as an EEPROM or a flash memory.

In one embodiment, the processor 110 can be central processing unit (CPU), controller, micro controller or other processing chips.

In one embodiment, the information interacting system 102 comprises a sending unit 1121, a receiving unit 1122, a confirming unit 1123, an adjusting unit 1124 and a monitoring unit 1125.

In one embodiment, the monitoring unit 1125 is configured to monitor whether the occupying channel of the OTT 10 has been occupied. When the mobile terminal 11 tries to join the information interacting device 1, the monitoring unit 1125 monitors if the occupying channel of the OTT 10 has been occupied.

In one embodiment, the sending unit 1121 is configured to send a request information when the occupying channel is idle, and the request information can be a request audio.

In one embodiment, the sending unit 1121 is further configured to send the full frequency signal with specific power. The sending unit 1121 sends the full frequency signal to the OTT 10 when then ID formation of the mobile terminal 11 has been set. The OTT 10 receives the full frequency signal and calculates signal attenuation degree. The OTT 10 sends the signal compensation value to the mobile terminal 11, and the signal compensation value is obtained according to the signal attenuation degree.

In one embodiment, the receiving unit 1121 is configured to receive the signal compensation value.

In one embodiment, the adjusting unit 1124 is configured to adjust the signal output power of the sending unit 1121 according to the signal compensation value.

In one embodiment, the sending unit 1121 is further configured to send types of information. The OTT 10 sets the first ID recognizing frequency and the information category frequency when the signal output power of the mobile terminal 11 is adjusted. For example, the first ID recognizing frequency can be 30 Hz, 40 Hz, 50 Hz and so on. The OTT 10 sets the information category frequency according to types of the information from the sending unit 1121. The OTT 10 can set information category frequency corresponding to message, MSN, phone call, low power being 110 Hz, 120 Hz, 130 Hz and 140 Hz.

In one embodiment, the sending unit 1121 is further configured to send the first ID recognizing frequency. The sending unit 1121 sends a audio with the first ID recognizing frequency when the mobile terminal 11 occurred a system event, such as low power. The OTT 10 receives and recognizes the first ID recognizing frequency, and the OTT 10 sends the first confirming information. The first confirming information can be a audio with specific frequency.

In one embodiment, the receiving unit 1122 is further configured to receive the first confirming information and sends the first confirming information to the confirming unit 1123.

In one embodiment, the confirming unit 1123 is configured to confirm whether the OTT 10 and the mobile terminal 11 are connected or not. The confirming unit 1123 confirms the mobile terminal 11 and the OTT 10 are connected when the confirming unit 1123 receives the first confirming information.

In one embodiment, the sending unit 1121 is further configured to send the information category frequency. The sending unit 1121 sends an audio with the information category frequency when the connection between the OTT 10 and the mobile terminal 11 is confirmed. For example, when the OTT 10 receives and recognizes 110 Hz audio, the OTT knows that the mobile terminal 11 has received message (relates to preset information category frequency), and the OTT 10 drives the display interface 12 to display the information. The OTT 10 sends the second confirming information when the OTT 10 receives the information category frequency. The second confirming information can be an audio with specific frequency.

In one embodiment, the receiving unit 1122 is further configured to receive the second confirming information and transmits the second confirming information to the confirming unit 1123.

In one embodiment, the confirming unit 1123 is further configured to receive the second confirming information and confirms if the OTT 10 has received the information category frequency.

Figure 4:
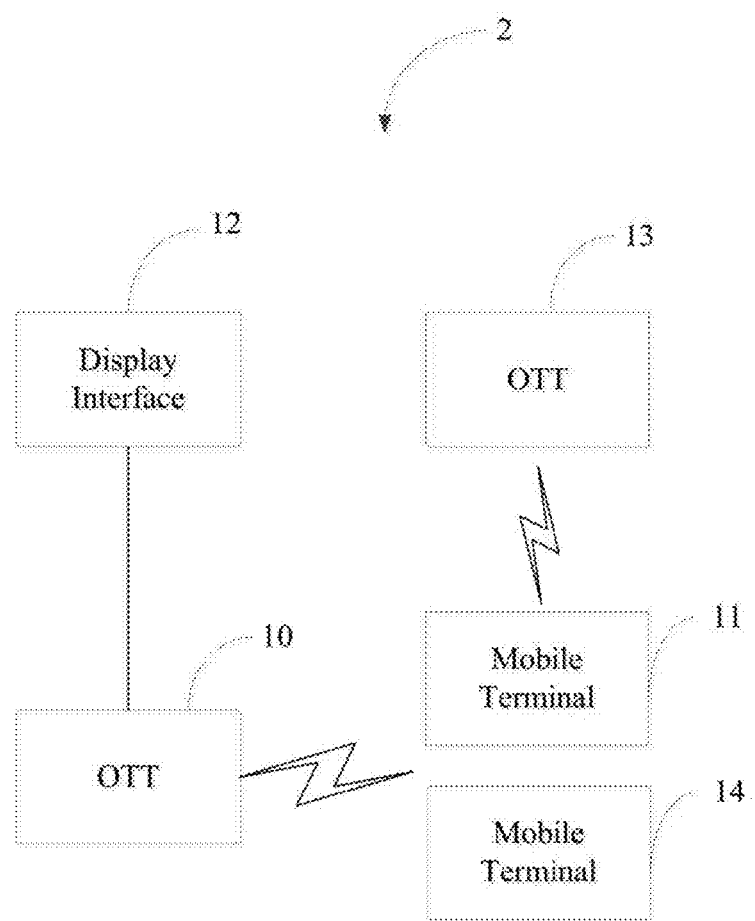
FIG. 4 illustrates a framework diagram of another embodiment of the information interaction device.

FIG. 4 illustrates a framework diagram of another embodiment of the information interaction device.

In one embodiment, the information interacting device 2 comprises OTT 10, OTT 13, mobile terminal 11, mobile terminal 14 and display interface 12. In other embodiment, the information interacting device 2 can comprises any number of OTT and mobile terminal.

In one embodiment, when the OTT 10 and OTT 13 set the first ID recognizing frequency of the mobile terminal 11 being 30 Hz, and the OTT 10 and OTT 13 set the first ID recognizing frequency of the mobile terminal 14 being 40 Hz, because the mobile terminal 11 and the mobile terminal 14 have same identification mark, the OTT 10 and OTT 13 can't recognize each mobile terminal correctly.

In one embodiment, the OTT 10 and the OTT 13 can set a second ID recognizing frequency for the mobile terminal 14 and the mobile terminal 11. The second ID recognizing frequency and the first ID recognizing frequency are configured to identify the mobile terminal 11 and the mobile terminal 14 together. For example, OTT 10 sets the second ID recognizing frequency of the mobile terminal 11 being 32.5 Hz, and the OTT 10 sets the second ID recognizing frequency of the mobile terminal 14 being 37.5. The identification mark of the mobile terminal 11 comprises the second ID recognizing frequency 32.5 Hz and the first ID recognizing frequency 30 Hz, and the identification mark of the mobile terminal 14 comprises the second ID recognizing frequency 37.5 Hz and the first ID recognizing frequency 40 Hz. In this embodiment, the OTT 10 and OTT 13 could recognize the mobile terminal 11 and the mobile terminal 13 correctly.

Figure 5:
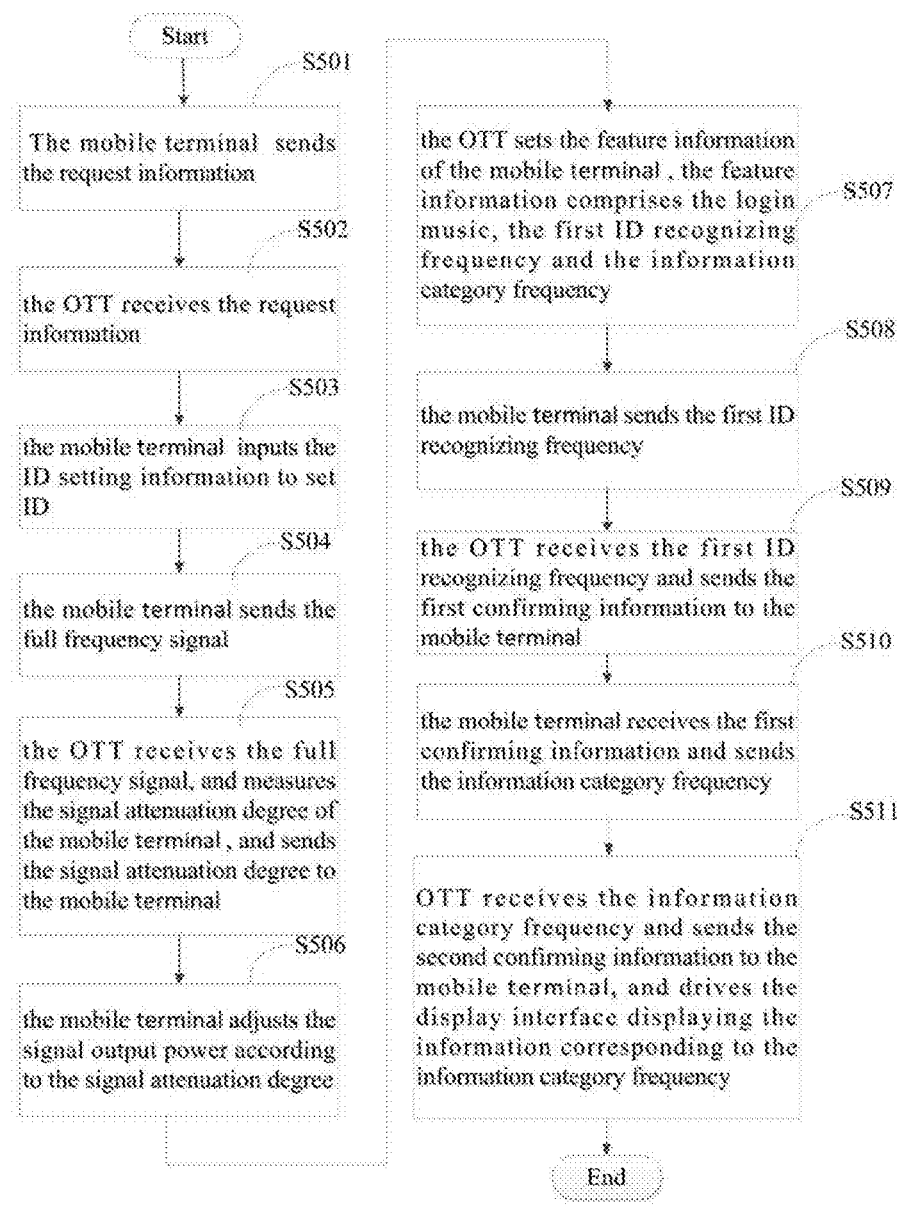
FIG. 5 illustrates a flow diagram of an embodiment of an information obtaining method.

FIG. 5 illustrates a flow diagram of an embodiment of an information obtaining method.

Referring to FIG. 5, a flowchart is presented in accordance with an example embodiment of an information obtaining method 5. The information obtaining method 5 is provided by way of example, as there are a variety of ways to carry out the method. The information obtaining method 5 described below can be carried out using the configurations illustrated in FIG. 1~FIG. 4, for example, and various elements of this figure are referenced in explaining the information obtaining method 5. Each block shown in FIG. 5 represents one or more processes, methods, or subroutines, carried out in the exemplary information obtaining method 5. Additionally, the illustrated order of blocks is by example only and the order of the blocks can change. The information obtaining method 5 comprises the following steps:

Step S501, the mobile terminal 11 sends the request information.

Step S502, the OTT 10 receives the request information.

Step S503, the mobile terminal 11 inputs the ID setting information to set ID.

Step S504, the mobile terminal 11 sends the full frequency signal.

Step S505, the OTT 10 receives the full frequency signal, and measures the signal attenuation degree of the mobile terminal 11, and sends the signal attenuation degree to the mobile terminal 11.

Step S506, the mobile terminal 11 adjusts the signal output power according to the signal attenuation degree.

Step S507, the OTT 10 sets the feature information of the mobile terminal 11, the feature information comprises the login music, the first ID recognizing frequency and the information category frequency.

Step S508, the mobile terminal 11 sends the first ID recognizing frequency.

Step S509, the OTT 10 receives the first ID recognizing frequency and sends the first confirming information to the mobile terminal 11.

Step S510, the mobile terminal 11 receives the first confirming information and sends the information category frequency.

Step S511, the OTT 10 receives the information category frequency and sends the second confirming information to the mobile terminal 11, and drives the display interface 12 displaying the information corresponding to the information category frequency.

Figure 6:
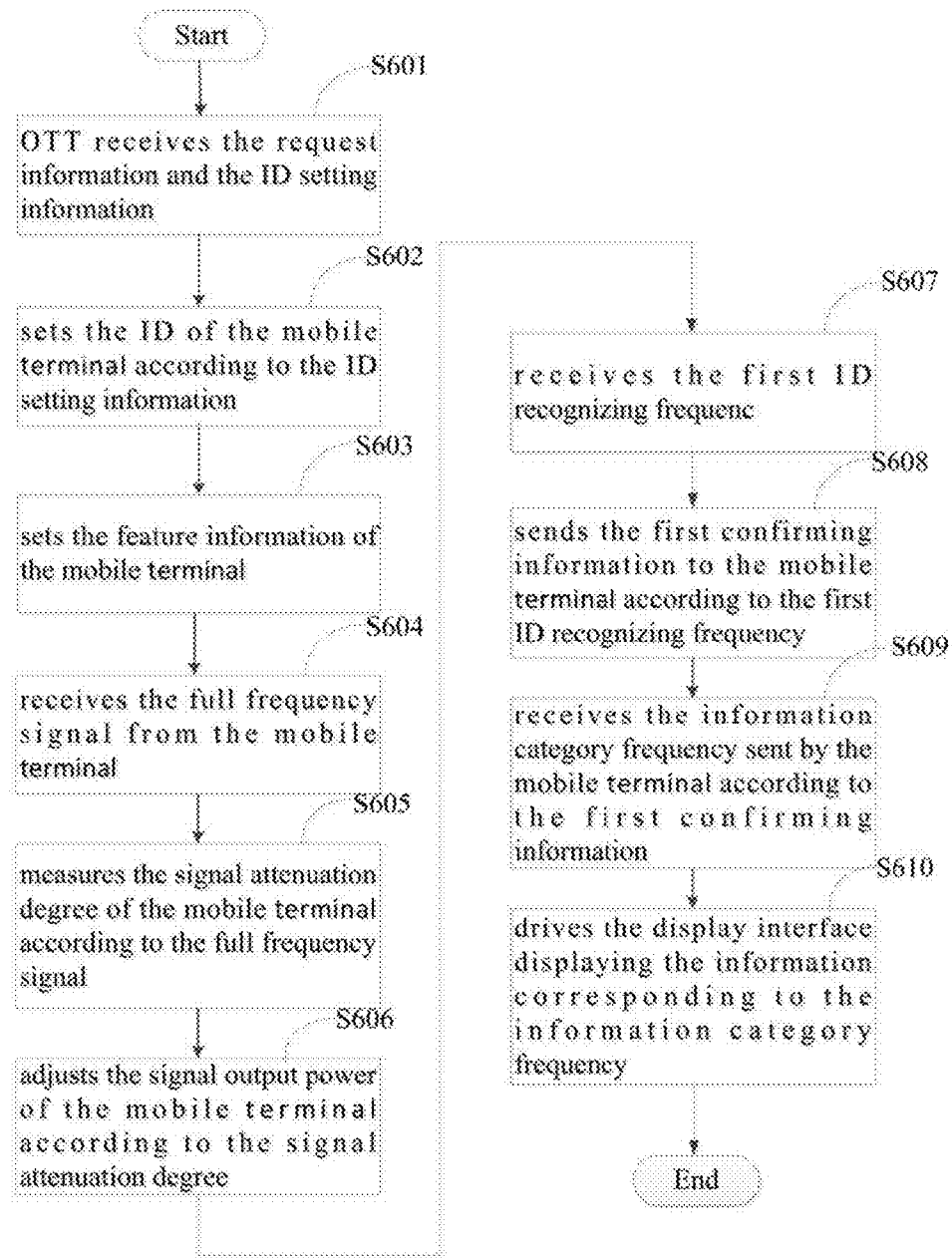
FIG. 6 illustrates a flow diagram of another embodiment of an information obtaining method.

FIG. 6 illustrates a flow diagram of another embodiment of an information obtaining method.

Referring to FIG. 6, a flowchart is presented in accordance with an example embodiment of an information obtaining method 6. The information obtaining method 6 is provided by way of example, as there are a variety of ways to carry out the method. The information obtaining method 6 described below can be carried out using the configurations illustrated in FIG. 1~FIG. 4, for example, and various elements of this figure are referenced in explaining the information obtaining method 6. Each block shown in FIG. 6 represents one or more processes, methods, or subroutines, carried out in the exemplary information obtaining method 6. Additionally, the illustrated order of blocks is by example only and the order of the blocks can change. The information obtaining method 6 comprises the following steps:

Step S601, the OTT 10 receives the request information and the ID setting information.

Step S602, the OTT 10 sets the ID of the mobile terminal 11 according to the ID setting information.

Step S603, the OTT 10 sets the feature information of the mobile terminal 11.

Step S604, the OTT 10 receives the full frequency signal from the mobile terminal 11.

Step S605, the OTT 10 measures the signal attenuation degree of the mobile terminal 11 according to the full frequency signal.

Step S606, the OTT 10 adjusts the signal output power of the mobile terminal 11 according to the signal attenuation degree.

Step S607, the OTT 10 receives the first ID recognizing frequency.

Step S608, the OTT 10 sends the first confirming information to the mobile terminal 11 according to the first ID recognizing frequency.

Step S609, the OTT 10 receives the information category frequency sent by the mobile terminal 11 according to the first confirming information.

Step S610, the OTT 10 drives the display interface 12 displaying the information corresponding to the information category frequency.

Figure 7:
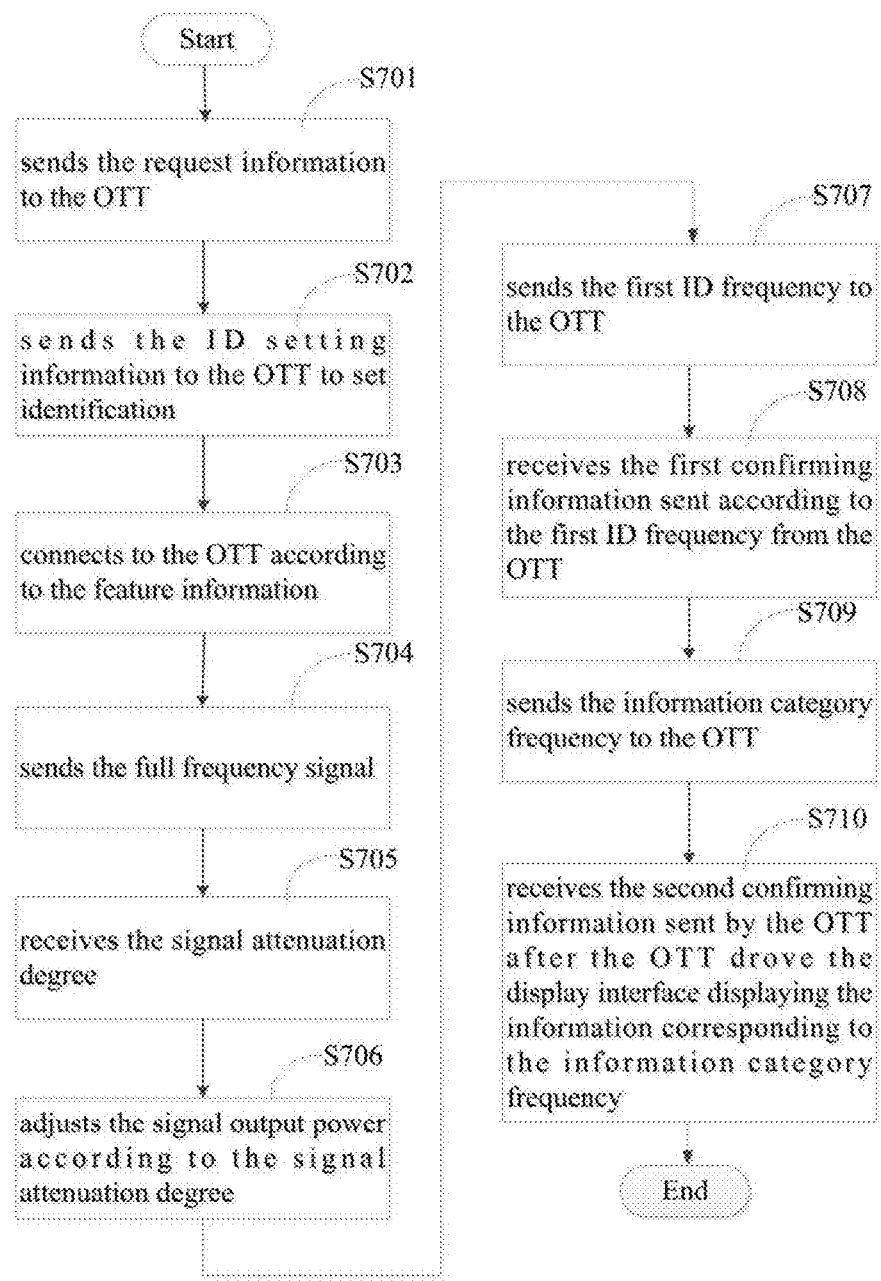
FIG. 7 illustrates a flow diagram of another embodiment of an information obtaining method.

FIG. 7 illustrates a flow diagram of another embodiment of an information obtaining method.

Referring to FIG. 7, a flowchart is presented in accordance with an example embodiment of an information obtaining method 7. The information obtaining method 7 is provided by way of example, as there are a variety of ways to carry out the method. The information obtaining method 7 described below can be carried out using the configurations illustrated in FIG. 1~FIG. 4, for example, and various elements of this figure are referenced in explaining the information obtaining method 7. Each block shown in FIG. 7 represents one or more processes, methods, or subroutines, carried out in the exemplary information obtaining method 7. Additionally, the illustrated order of blocks is by example only and the order of the blocks can change. The information obtaining method 6 comprises the following steps:

Step S701, the mobile terminal 11 sends the request information to the OTT 10.

Step S702, the mobile terminal 11 sends the ID setting information to the OTT 10 to set identification.

Step S703, the mobile terminal 11 connects to the OTT 10 according to the feature information.

Step S704, the mobile terminal 11 sends the full frequency signal.

Step S705, the mobile terminal 11 receives the signal attenuation degree.

Step S706, the mobile terminal 11 adjusts the signal output power according to the signal attenuation degree.

Step S707, the mobile terminal 11 sends the first ID frequency to the OTT 10.

Step S708, the mobile terminal 11 receives the first confirming information sent according to the first ID frequency from the OTT 10.

Step S709, the mobile terminal 11 sends the information category frequency to the OTT 10.

Step S710, the mobile terminal 11 receives the second confirming information sent by the OTT 10 after the OTT 11 drove the display interface 12 displaying the information corresponding to the information category frequency.

The embodiments shown and described above are only examples. Many details are often found in the art such as the other features of a sharing system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An information obtaining method, executable by a processor of an over the top (OTT) for interacting with a mobile terminal and displaying notification information of the mobile terminal on a display interface, the information obtaining method comprising:
   receiving a first ID recognizing frequency from the mobile terminal;
   sending first confirming information to the mobile terminal according to the first ID recognizing frequency;
   receiving an information category frequency sent by the mobile terminal according to the first ID recognizing frequency; and
   displaying the notification information corresponding to the information category frequency on the display interface.

2. The information obtaining method as claimed in claim 1, wherein the information obtaining method further comprises:
   receiving a request information and an ID information from the mobile terminal;
   setting identity of the mobile terminal according to the ID information; and
   setting a feature information of the mobile terminal;
   wherein, the ID formation comprises name of the mobile terminal.

3. The information obtaining method as claimed in claim 2, wherein the feature information comprises login music, the first ID recognizing frequency and the information category frequency, and the OTT recognizes the mobile terminal by the first ID recognizing frequency.

4. The information obtaining method as claimed in claim 3, wherein the feature information further comprises at least one second ID recognizing frequency when the number of the OTT is at least 2, and each OTT recognizes the mobile terminal according to the first ID recognizing frequency or the second ID recognizing frequency.

5. The information obtaining method as claimed in claim 2, wherein after the identity of the mobile terminal is set, the information obtaining method further comprises:
receiving a full frequency signal sent by the mobile terminal;
measuring signal attenuation degree of the mobile terminal according to the full frequency signal; and
adjusting signal output power of the mobile terminal according to the signal attenuation degree.

6. The information obtaining method as claimed in claim 1, wherein after the information category frequency is received, the information obtaining method further comprises:
sending second confirming information to the mobile terminal.

7. An information obtaining method, executable by a processor of a mobile terminal for interacting with an over the top (OTT) end and displaying notification information of the terminal on a display interface, the information obtaining method comprising:
sending a first ID recognizing frequency to the OTT;
receiving first confirming information sent by the OTT, wherein the first confirming information is generated according to the first ID recognizing frequency;
sending an information category frequency to the OTT; and
receiving second confirming information sent by the OTT, wherein the second confirming information is generated after the display interface displays the notification information according to the information category frequency.

8. The information obtaining method as claimed in claim 7, further comprising:
sending a request information to the OTT;
sending an identity information to the OTT; and
connecting to the OTT according to the feature information set by the OTT.

9. The information obtaining method as claimed in claim 8, wherein after the identity information is set, the information obtaining method further comprises:
sending a full frequency signal;
receiving a signal attenuation degree sent by the OTT measured according to the full frequency signal; and
adjusting signal output power according to the signal attenuation degree.

10. The information obtaining method as claimed in claim 8, wherein the feature information comprises login music, the first ID recognizing frequency and the information category frequency, and the mobile terminal recognized by the OTT by the first ID recognizing frequency.

11. The information obtaining method as claimed in claim 10, wherein the feature information further comprises a second ID recognizing frequency when the number of the OTT is at least 2, and the OTT recognizes the mobile terminal according to the first ID recognizing frequency and the second ID recognizing frequency.

12. A non-transitory storage medium, storing a set of instructions, the set of instructions being executed by a processor of an over the top (OTT) for interacting with a mobile terminal and displaying notification information on a display interface, to perform a method comprising:
receiving a first ID recognizing frequency from mobile terminal;
sending first confirming information to the mobile terminal according to the first ID recognizing frequency;
receiving an information category frequency sent by the mobile terminal according to the first ID recognizing frequency; and
displaying the notification information corresponding to the information category frequency on the display interface.

13. The non-transitory storage medium as claimed in claim 12, wherein the method further comprises:
receiving a request information and an ID information from the mobile terminal;
setting identity of the mobile terminal according to the ID information; and
setting a feature information of the mobile terminal;
wherein, the ID formation comprises name of the mobile terminal.

14. The non-transitory storage medium as claimed in claim 13, wherein the feature information comprises login music, the first ID recognizing frequency and the information category frequency, and the OTT recognizes the mobile terminal by the first ID recognizing frequency.

15. The non-transitory storage medium as claimed in claim 14, wherein the feature information further comprises a second ID recognizing frequency when the number of the OTT is at least 2, and the OTT recognizes the mobile terminal according to the first ID recognizing frequency and the second ID recognizing frequency.

16. The non-transitory storage medium as claimed in claim 13, wherein alter the identity of the mobile terminal is set the method further comprises:
receiving a full frequency signal sent by the mobile terminal;
measuring signal attenuation degree of the mobile terminal according to the full frequency signal; and
adjusting signal output power of the mobile terminal according to the signal attenuation degree.

17. The non-transitory storage medium as claimed in claim 12, wherein after the information category frequency is received, the method further comprises:
sending second confirming information to the mobile terminal.

* * * * *